(12) United States Patent
Ruggieri et al.

(10) Patent No.: US 11,515,768 B2
(45) Date of Patent: Nov. 29, 2022

(54) METHOD OF ASSEMBLAGE FOR A WINDING GROUP OF A BAR WINDING FOR AN ELECTRIC MACHINE

(71) Applicant: TECNOMATIC S.P.A., Corropoli (IT)

(72) Inventors: Giovanni Ruggieri, Corropoli (IT);
Sergio Tancredi, Corropoli (IT);
Maurilio Micucci, Corropoli (IT);
Giuseppe Ranalli, Corropoli (IT)

(73) Assignee: TECNOMATIC S.P.A., Corropoli (IT)

( * ) Notice: Subject to any disclaimer, the term of this patent is extended or adjusted under 35 U.S.C. 154(b) by 0 days.

(21) Appl. No.: 17/566,781

(22) Filed: Dec. 31, 2021

(65) Prior Publication Data

US 2022/0123632 A1   Apr. 21, 2022

Related U.S. Application Data

(62) Division of application No. 17/046,356, filed as application No. PCT/IB2019/050998 on Feb. 7, 2019, now Pat. No. 11,283,335.

(30) Foreign Application Priority Data

May 9, 2018 (IT) .......................... 102018000005190

(51) Int. Cl.
| | |
|---|---|
| *H02K 15/00* | (2006.01) |
| *H02K 15/06* | (2006.01) |
| *B23P 19/02* | (2006.01) |

(52) U.S. Cl.
CPC ............ *H02K 15/064* (2013.01); *B23P 19/02* (2013.01); *Y10T 29/49009* (2015.01); *Y10T 29/53143* (2015.01)

(58) Field of Classification Search
CPC ....... B21F 1/004; B21F 1/008; H02K 15/045; H02K 15/0056; H02K 15/04;
(Continued)

(56) References Cited

U.S. PATENT DOCUMENTS 7,140,098 B2 * 11/2006 Maeda ............... H02K 15/0414
29/455.1
7,480,987 B1   1/2009 Guercioni
(Continued)

FOREIGN PATENT DOCUMENTS

JP   2003134751 A   5/2003
JP   2004072839 A   3/2004
(Continued)

OTHER PUBLICATIONS

International Search Report and Written Opinion for corresponding PCT/IB2019/050998 dated May 22, 2019, 11 pages.

*Primary Examiner* — Thiem D Phan
(74) *Attorney, Agent, or Firm* — Armstrong Teasdale LLP (57) ABSTRACT

An assembly for assembling a winding group of a bar winding for an electric machine is provided. The winding group includes a plurality of bar conductors, each bar conductor having a first leg, a second leg and a bridge portion connecting the first leg to the second leg, and being shaped so that the first and second legs are mutually spread by a predetermined distance. The assembly includes an annular fixture delimiting a plurality of slots, each slot receiving at least one portion of either the first leg or the second leg, a guiding device defining an annular containment housing, receiving at least partially the first and second legs of the plurality of legs of the plurality of bar conductors that are housed in the plurality of slots, forming at least one radial containment wall for the first and second legs.

4 Claims, 8 Drawing Sheets

(58) Field of Classification Search
CPC .......... H02K 15/0421; Y10T 29/53143; Y10T 29/53161; Y10T 29/49822; Y10T 29/49009; B21D 11/10
USPC .... 29/596, 732, 34 R, 592.1, 598, 721, 729, 29/736, 825, 874, 882
See application file for complete search history.

(56) References Cited

U.S. PATENT DOCUMENTS

| | | | |
|---|---|---|---|
| 7,622,843 B2 | 11/2009 | Cai | |
| 9,520,762 B2 | 12/2016 | Guercioni | |
| 10,224,789 B2 | 3/2019 | Corbinelli et al. | |
| 11,063,498 B2 * | 7/2021 | Nishino | H02K 15/0081 |
| 2009/0302705 A1 | 12/2009 | Guercioni | |

FOREIGN PATENT DOCUMENTS

| | | | |
|---|---|---|---|
| JP | 2012151996 A | 8/2012 |
| JP | 2015198563 A | 11/2015 |

\* cited by examiner

METHOD OF ASSEMBLAGE FOR A WINDING GROUP OF A BAR WINDING FOR AN ELECTRIC MACHINE

This is a divisional application of U.S. application Ser. No. 17/046,356 having a filing date of Oct. 9, 2020, which is a National Phase Application of International Patent Application No. PCT/IB2019/050998, having an International Filing Date of Feb. 7, 2019, which claims priority to Italian Patent Application No. 102018000005190, filed May 9, 2018, each of which is hereby incorporated by reference in their entirety.

FIELD OF THE INVENTION

The present description relates to an assembly for the assemblage of a winding group of a bar winding for an electric machine.

Moreover, the present description relates to a method of assemblage for a winding group of a bar winding for an electric machine.

BACKGROUND ART

It is generally known to provide stators of electric machines, such as generators or electric motors, e.g. for applications on hybrid electric vehicles (HEVs), in which the stator winding is formed by a plurality of bar conductors folded and variously interconnected to provide electric windings, so as to make electric windings also known as "bar windings". These folded bar conductors are also called "hairpin conductors" or simply "hairpins". The bar windings can be formed by one or more groups of concentric windings, sometimes known as "crown of conductors".

In an electric machine, an axial direction, either coinciding with or parallel to the rotation axis of the rotor with respect to the stator, a radial direction (R-R), orthogonal to the axial direction, and a circumferential direction (C-C), orthogonal to both the axial direction and the radial direction are defined. The axial, radial and circumferential directions are also defined considering exclusively a stator, as well as considering exclusively a stator core, as well as considering exclusively a winding assembly or crown of conductors.

In particular, bar stator windings made by electric bar conductors are known. Such electric windings typically comprise one or more rings of conductors or winding groups, i.e. one or more mutually concentric annular-shaped arrays of conductors which are electrically connected to each other so as to complete the winding.

In general, the electric bar conductors may have a cross-section having different shapes. For example, "round wire conductors" bar conductors which have a circular cross-section are known. Moreover, "rectangular" bar conductors are known, which have a rectangular or substantially rectangular cross-section (such as, for example, a rectangular section with rounded corners), where rectangular refers both to the square section and to the "flat" section with which a rectangular-shaped section is generally indicated, wherein the two sides of the section are smaller than the other two. Furthermore, "trapezoidal" bar conductors are known, which have a trapezoidal-shaped cross-section.

The bar conductors which form bar windings of the prior art typically comprise a plurality of so-called "basic" conductors and a plurality of so-called "special" conductors, i.e. conductors required for the completion of the winding, such as phase terminals, jumpers, neutral connections, star centers, and the like. The basic conductors are usually preformed by folding in a "U" or "P" from straight bar conductors.

Document U.S. Pat. No. 7,480,987 describes an example of a preforming method of basic bar conductors (named "hairpin conductors" in such a document). Furthermore, called "I-pin" conductors, which have a single straight portion housed in a slot, are known. For example, they are used as phase terminals in document U.S. Pat. No. 7,622,843. The same document also shows "W-shaped conductors", wherein W-shaped connector may be formed by welding a hairpin stamped with an I-pin or by welding a fourth conductor with all three I-pins. Hereafter, the word "hairpin" will encompass all aforesaid types of "basic conductors".

The aforesaid "U" or "P"-shaped preformed conductors typically have two legs side-by-side, sometimes of different length, each having an end portion joined via a connecting bridge or connecting portion to the other leg, and an opposite free end portion.

In order to form a stator, it is known to subject the preformed bar conductors to two different types of twisting.

In a first type of twisting, also named "insertion side twisting", the preformed basic conductors are appropriately inserted in specific radially aligned pockets made in a twisting fixture which is adapted to deform such conductors after insertion. The twisting fixture is substantially used to spread the legs of the "U" or "P" shape to ensure that the two legs of a same conductor, after having extracted the conductor from the fixture, can be subsequently inserted into the slots of a stator core which are mutually circumferentially offset by a predetermined pitch, which is substantially equal to the distance between the spread legs.

After having been subjected to the first type of twisting, the bar conductors are typically inserted in bulk by means of a pre-assembly apparatus into the slots of the stator core through a first side thereof (so-called "insertion side" or "insertion face") with the respective free end portions protruding from a second side of the core (so-called "welding side" or "connection side" or "welding face") opposite to the first side.

On the basis of the specific winding pattern to be achieved, the free end portions protruding from the welding side may be subjected to a second type of twisting, also named "welding side twisting", e.g. after having been inserted in pockets made in an appropriate twisting fixture. The twisting fixture herein has the purpose of bending or twisting the free end portions of the conductors to appropriate shape such end portions and consequently allows performing the appropriate electric connections between the conductors in order to complete the winding.

Document US-2009-0302705 describes an example of twisting method from welding side of the type discussed above.

Figure 15:
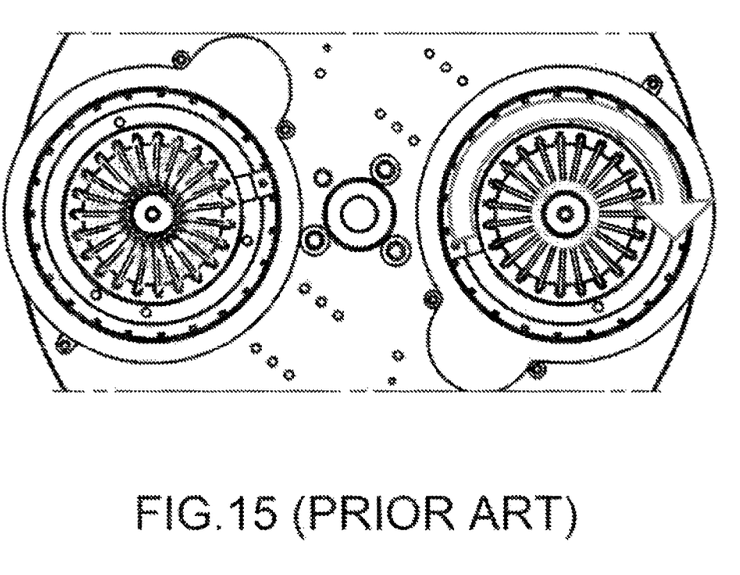
FIG. 15 is a plan and top view which diagrammatically shows a solution of the prior art.

By way of example, FIG. 15 shows a pre-assembly apparatus according to the prior art, which is applied to produce a winding group before it is inserted in a stator or a rotor (in particular for starter motors). Such apparatus uses guiding rollers of circular section hairpins, already spread, in particular so that each conductor has the respective legs apart by an angle corresponding to the angular distance between the two slots of the stator core in which they will be inserted. In particular, the pockets are used to provide vertical support while loading the hairpins, prior to rotation. The slots are provided on concentric rings and superimposed in axial direction to a third concentric element in which radial extending guides are present which guide the movement of the legs initially housed in the pockets. During said rotation, a ring and the third element rotate rigidly with respect to the other ring. At the beginning of said rotation, the upper portion of the leg of each hairpin emerges from the slot, which is axially superimposed to a guiding end of the third element, the low portion of the leg itself remaining in said guide which constrains the movement until the leg is approached to one of the rings.

By virtue of such an apparatus, all the hairpins inserted to assemble the winding are rotated simultaneously. The fulcrum of such rotation is the inner leg of each hairpin, so as to approach the conductors to one another and assemble the winding assembly or crown of conductors. Such device can be conveniently used for round wire conductors, while it is not adapted to be used, for example, with bar conductors having a cross-section different from circular shape, e.g. such as "rectangular" and "trapezoidal" conductors. Indeed, the rotation of such conductors with non-circular cross-section in a circular slot would not be very smooth and would entail a risk of damaging the hairpin. The use of bushings to make the section of the pockets from rectangular to circular or of pockets having rectangular cross-section would be complex and also, due to the non-null thickness of the walls which would surround the legs of the hairpin, would not allow taking the hairpin completely to the final pre-assembly position in the hairpin crown.

Solutions which can at least partially be attributed to the aforesaid type are disclosed, for example, in documents JP-2015-198563 and JP-2004-072839.

Further examples of known solutions are shown in documents JP-2003-134751 and JP-2012-51996.

According to another aspect of the prior art, since the pockets which the aforesaid concentric guide rollers are provided with all have the same depth and a closed bottom, such known fixture has the drawback of not being able to be used to pre-assemble winding assemblies comprising basic bar conductors having legs of different length, a feature which may be necessary in order to achieve some kind of winding groups.

Equally, the apparatus of the prior art cannot assemble hairpins having different span/pitch. A further drawback of the known fixture with the concentric rollers described above is represented in that, in order to extract the winding group made by means of such fixture and insert it in the respective core stator or rotor, it is typically necessary to provide an additional gripper assembly to extract the winding group in block from the fixture and to insert it precisely in the stator core.

The need is felt to suggest an alternative assembly and method with respect to those discussed above with reference to the prior art to make a winding group of a bar winding for an electric machine which can at least partially overcome the drawbacks described above with reference to the prior art.

In particular, the need is felt to provide an assembly and/or a method which allows producing a winding group of a bar winding for an electric machine also with bar conductors of different type with respect to round wire conductors.

At the same time, the need is felt to provide an assembly and/or a method which allow producing a winding group of a bar winding for an electric machine also with bar conductors having legs of different length.

Additionally, the need is felt to provide an assembly and/or a method which allows inserting in a stator or rotor core or winding group of a bar winding for an electric machine made with such assembly without necessarily requiring an additional gripper assembly configured to insert the formed winding group in the block in the stator or rotor.

SUMMARY OF THE INVENTION

It is an object of the present invention to overcome at least in part the drawbacks of the prior art illustrated hereto and to provide a solution to at least some of the aforesaid requirements.

These and other objects are achieved by an assembly and a method as described and claimed herein.

Some advantageous embodiments are the subject of the dependent claims.

BRIEF DESCRIPTION OF THE DRAWINGS

Further features and advantages of the assembly and method according to the invention will be apparent from the description provided below of preferred embodiments thereof, given by way of non-limiting example, with reference to the accompanying drawings, in which.

DESCRIPTION OF SOME PREFERRED EMBODIMENTS

According to a general embodiment, an assembly 1, or an apparatus 1, is provided for assembling at least one winding group 2, or crown of conductors 2, of a bar winding for an electric machine.

An assembly 1, or apparatus 1, according to the invention is adapted to assemble a crown of conductors 2.

The expression "crown of conductors 2" or "winding group 2" indicates a ring of bar conductors, preferably comprising exclusively basic conductors or a prevailing number of basic conductors, which is intended to be arranged in a stator core or a rotor core of an electric machine to make an electric winding or a part of an electric winding of an electric machine.

Said winding assembly 2 or crown of conductors 2 comprises a plurality of bar conductors 4.

According to an embodiment, said assembly 1 is adapted to allow the assembly of part of a crown of conductors 2 formed by hairpins or "basic conductors" with addition, either in sequence or in parallel, of hairpins or "special" conductors to complete the crown of conductors itself. For example, the assembly 1 is adapted to allow the possibility to assemble the crown of conductors 2 with conductors or hairpins having different hairpin span 36, and/or hairpin pitch 36, and/or hairpin throw 36. For example, the assembly 1 is adapted to allow the possibility to assemble crowns with terminals on stator side on which the hairpins are inserted. For example, the assembly 1 is adapted to allow the possibility to assemble crowns with fork-shaped or "W"-shaped hairpins, used for star point connection.

Preferably, each bar conductor 4 of said plurality of bar conductors 4 comprises a first leg 6, a second leg 8 and a bridge portion 10, or head portion 10, so as to mutually connect said first leg 6 to said second leg 8. In particular, each bar conductor 4 is shaped so as to have the respective legs 6, 8 mutually spread apart by a predetermined distance. According to an embodiment, the legs 6,8 of each conductor 4 are spread so that such legs 6,8 can be subsequently inserted into the respective slots of a stator core 34 in which the winding group 2 will be arranged.

Said assembly 1 comprises an annular fixture 12, or fixture 12, which extends around a fixture rotation axis A-A, or axis A-A, defining an axial direction either coincident with or parallel to said fixture rotation axis A-A.

Said annular fixture 12 further defines a radial direction R-R, which is orthogonal to said axial direction A-A and incident with said axis A-A, and a circumferential direction C-C, which is orthogonal to both said axial direction A-A and said radial direction R-R.

Preferably, said radial direction R-R further defines a radial inner direction RI facing towards said axis A-A and a radially outer direction RE, opposite to said radial inner direction RI. Preferably, said annular fixture 12 surrounds a given volume of a substantially discoid shape, preferably centered on said axis A-A.

In accordance with an embodiment, said annular fixture 12 has an inner side 14 facing said axis A-A and an outer side 15, opposite to said inner side 14.

Said annular fixture 12 delimits a plurality of slots 16, 16', 16".

Each slot 16 of said plurality of slots 16, 16', 16" is adapted to receive at least one portion of either said first leg 6 or said second leg 8 of said conductor bar 4. In other words, each slot 16 of said plurality of slots is intended to receive at least one portion of a respective leg 6, 8 of a bar conductor 4.

According to a preferred embodiment, said assembly 1 further comprises a conductor insertion device 18, or insertion device 18, adapted to insert at least one leg 6, 8, and preferably each leg 6,8 of at least one bar conductor 4 of said plurality of bar conductors 4 into a respective slot 16.

According to an embodiment, said conductor insertion device 18 is a so-called stacker 18 of type known in itself.

It is worth noting that the distance in circumferential direction C-C between two contiguous slots 16 is equal to the distance in circumferential direction C-C between two contiguous slots of the stator core 34. In other words, the fixture 12 has a number of slots 16 equal to the number of slots of the stator core 34.

In accordance with an embodiment, said plurality of slots 16 defines a circular array of slots 16 arranged around axis A-A.

The slots of the stator core 34 into which the legs 6,8 of each bar conductor 4 will be inserted are mutually circumferentially offset from each other by a predetermined hairpin throw 36 or hairpin span 36 or hairpin pitch 36, substantially equal to a multiple 36 of the predetermined slot pitch 37 of the stator core 34.

The radial extension of a bar conductor 4 or hairpin 4 is the distance in radial direction between its legs 6, 8, when it is mounted on the stator, measured in terms of slot layers. An assembly 1 according to a preferred embodiment may assemble hairpins 4 or bar conductors 4 with any radial extension.

Preferably, said multiple 36 of one slot pitch 37 is substantially equal to the distance between the spread legs 6, 8. Preferably, each bar conductor 4 is shaped so that the respective legs 6, 8 are mutually spread by a predetermined distance corresponding to a multiple 36 of the slot pitch 37 of the stator core 34.

Preferably, the expression "circumferentially offset" or "offset in circumferential direction C-C" means that the slots 16 lie on different incident radii of said axis A-A.

As shown for example in FIG. 5, such predefined distance substantially equal to a multiple 36 of the slot pitch 37 of the stator 34 is equal to a multiple 36 of the slot pitch 37, i.e. equal to one hairpin throw 36 of an annular fixture 12 of the assembly 1, which comprises a plurality of slots 16 and which will be described in greater detail below.

In accordance with an embodiment, said multiple 36 of the slot pitch 37 is the angular distance between a slot 16' which receives the first leg 6 of the bar conductor 4 and a slot 16" which receives the second leg 8 of the bar conductor 4.

According to an embodiment, said multiple 36 is the result of the division between the angular distance between two legs 6, 8 of a same conductor 4 and the angular distance between two adjacent slots 16, or the slot pitch 37.

It is worth noting that the reference numerals 16' and 16" are used only to indicate specifically two slots 16 of said plurality of slots 16 in which the first leg 6 and the second leg 8 of the bar conductor 4 are respectively received. In other words, the slots 16' and 16" are slots having the same characteristics as the other slots 16 of said plurality of slots.

Preferably, said multiple 36 of the slot pitch 37 is a distance equal to a multiple of the extension in circumferential direction C-C of the circumferential distance between the two adjacent slots 16 of the annular fixture 12, although the legs 6, 8 may be misaligned in circumferential direction C-C, i.e. may lie on two distinct concentric circumferences.

According to a preferred embodiment, said multiple 36 of the slot pitch 37 is evaluated by counting the number of single slots 16 interposed between the slot 16' which receives the first leg 6 of the bar conductor 4 and a slot 16" which receives the second leg 8 of the bar conductor 4 plus one.

According to an embodiment, said hairpin throw 36 is substantially equal to the angular distance between a first wall 43' of the first slot 16', preferably a substantially radial wall, and a second wall 43" of a second slot 16", preferably said first and second wall 43', 43" both facing circumferential direction C-C and same circumferential way. In other words, said first part 43' and said second wall 43" preferably agree in direction.

With this regard, it is worth noting that although reference is made only to the stator core 34 in the present description, the teachings of the present description also apply to the case in which the winding group 2 made by means of the assembly 1 is intended to be inserted into the slots of a rotor core of the rotor of an electric machine. Therefore, if the winding group 2 is intended to be inserted into the slots of a rotor core, each bar conductor 4 is shaped so that the respective legs 6, 8 are mutually spread by a distance corresponding to a desired distance substantially equal to a multiple of the predetermined slot pitch of the rotor core.

According to a preferred embodiment, all bar conductors 4 have respective legs spaced by the same distance. In other words, the legs 6, 8 of each conductor 4 will be inserted in the slots of the stator core 34 circumferentially and mutually offset by the same multiple 36 of the slot pitch 37. For example, said multiple 36 of the slot pitch 37 is evaluated as the distance in circumferential direction C-C between two different incident radii of said axis A-A and incident with respective slots 16', 16".

According to an embodiment, the bar conductors 4 may have legs 6, 8 spaced apart by a distance different from conductor to conductor, in other words the bar conductors 4 may have different hairpin throws 36. Preferably, the assembly 1 can assemble one crown of conductors 2 at a time containing multiple variants of bar conductors 4 which differ by hairpin throw 36.

According to an embodiment, such as by way of non-limiting example in the embodiment shown in the appended figures, such hairpin throw 36 of stator core 34 of the rotor core, equal to a multiple of the pitch slots 36 or hairpin throw 36 of the fixture 12, is equal to six slots.

According to a preferred embodiment, the bar conductors 4 which form the winding group 2 are all basic conductors 4. Such basic conductors 4, according to the specific winding pattern to be made, may in particular have all legs 6, 8 of the same length (as in the example shown in the appended figures), or all the legs 6, 8 of different lengths, or have legs 6,8 partly of the same length and legs 6, 8 partly of different length. According to an embodiment, a same bar conductor 4 comprises legs 6, 8 of different length.

In the example illustrated in the appended figures, the bar conductors 4 are rectangular conductors. It is worth noting that an assembly 1 according to the present description may be conveniently used with bar conductors 4 of any type, such as for example round wire conductors or trapezoidal conductors. It is worth noting that the expression "rectangular conductor" means a bar conductor, i.e. a bar connector of the hairpin type, which has a rectangular or substantially rectangular cross-section (such as, for example, a generally rectangular section with rounded corners), where rectangular refers both to the square section and to the "flat" section with which a rectangular-shaped section is generally indicated, wherein the two sides of the section are smaller than the other two. The expression "round wire conductor" indicates a bar conductor having a circular cross-section. The expression "trapezoidal conductor" indicates a bar conductor having a trapezoidal cross-section.

The bar conductors 4 can be shaped so as to have the aforesaid legs 6, 8 spread as described above by means of fixtures of type known in itself, of automatic type or manual type. For example, the legs 6, 8 of the bar conductors 4 can be shaped by way of non-limiting example by means of an appropriate fixture and perform a "input side twisting" of known type either by means of robotic arms or by means of shaping fixtures of known type provided with an appropriately shaped punch.

According to a preferred embodiment, said annular fixture 12 comprises a fixture body 13, preferably of substantially annular shape, and a plurality of teeth 19, wherein two adjacent teeth of said plurality of teeth 19 at least partially delimit a slot 16. According to an embodiment, said teeth 19 protrude cantilevered from said fixture body 13 towards said axis A-A to form an annular comb, wherein said plurality of teeth 19 delimits said plurality of slots 16. Preferably, two adjacent teeth 19 of said plurality of teeth 19 delimit a slot 16 in circumferential direction C-C.

According to an embodiment, at least some teeth 19 of said plurality of teeth 19, and preferably all the teeth 19 of said plurality of teeth 19, comprise a projection which forms at least one slot bottom wall 21. In this manner, a radial abutment is formed for the legs of the bar conductors 4 when inserted into the respective slots 16', 16".

According to an embodiment, said at least one slot bottom wall 21 is formed by the annular fixture body 12.

According to an embodiment, at least some teeth 19 of said plurality of teeth 19, and preferably all the teeth 19 of said plurality of teeth 19, each have a curved wall 43', 43" which at least partially delimits a slot 16. Preferably, said curved wall delimits a slot 16 in circumferential direction C-C.

The slots can be variously arranged with respect to the annular fixture 12. According to an embodiment, as shown by way of non-limiting example in the appended figures, the slots 16 can be accessed radially from said inner side 14 of the annular fixture 12. In other words, each of said slots 16 can be accessed through a slot opening facing towards said inner side 14. According to an embodiment, the slots 16 can be accessed from said outer side 15 of the annular fixture 12 (not shown).

According to an embodiment, each slot 16 of said plurality of slots can be accessed axially, in other words can be accessed in axial direction A-A.

When in operating conditions, a bar conductor 4 is placed to approach said annular fixture 12 and mounted on said conductor insertion device 18.

Preferably, said conductor insertion device 18 comprises at least one insertion guiding device 29, adapted to guide the insertion movement of the legs 6, 8 of the bar conductor 4 into the respective slots 16 of the annular fixture 12. For example, said at least one insertion guiding device 18 comprises a pair of opposing guide grooves, each guide grooves being adapted to guide the insertion movement of a leg 6, 8 in a respective slot 16. Preferably, the distance between said two opposite guide grooves is substantially equal to said hairpin throw 36.

According to an embodiment, said insertion guiding device 29 is inserted from the input side 41 of the annular fixture 12, to insert the legs 6, 8 of said bar conductor 4 into respective slots of the annular fixture 12 from the input side 41. According to a preferred embodiment, said insertion guiding device 29 extends in axial direction.

When in operating conditions, said conductor insertion device 18 applies a thrust action, preferably applied on said bridge portion 10 of the bar conductor 4 to insert the legs of the bar conductor 4 into the respective slots 16 of the annular fixture 12, preferably by cooperating with said insertion guiding device 29.

In the example shown in the appended figures, the conductor insertion device 18 is configured to engage the legs 6, 8 of each bar conductor 4 axially into the respective slots 16 from the insertion side 41 of the annular fixture 41.

Preferably, an insertion side 41 is defined in said annular fixture 12, towards which the connecting portions 10 of the bar conductors 4 emerge or protrude when inserted into the annular matrix 12, and an insertion-opposite side 42, opposite to said insertion side 41 with respect to the body of the annular matrix 12. For example, said insertion side 41 and said insertion-opposite side 42 are opposite in axial direction and both facing axially.

Preferably, said conductor insertion device 18 is configured to insert said bar conductors 4 from the input side 41, preferably one at a time.

Figure 4:
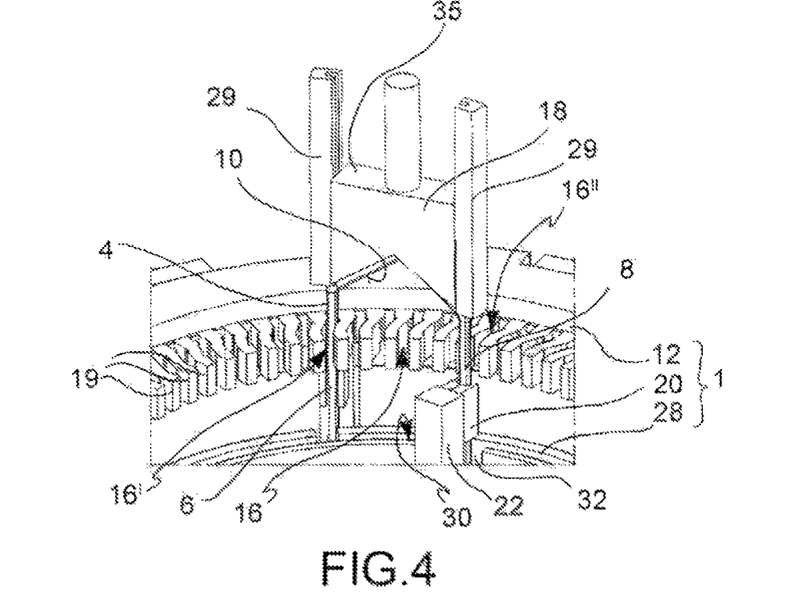
FIG. 4 shows a detail of the assembly in FIG. 3, in which the conductor moving device is about to insert the conductor legs in the guiding device, according to a possible mode of operation.

As shown for example in FIG. 4, at least some of said legs 6, 8, and preferably each leg of said legs, each bar conductor 4, axially protrudes or projects from the axial dimension of the annular fixture 12 by a certain length.

Preferably, when the legs 6 and 8 of said bar conductor 4 are housed in respective slots 16 of the annular fixture 12, a leg proximal portion 7 is defined, proximal with respect to said bridge portion 10, and a distal portion of the leg 9 comprising a free end 5 of said leg 6 or 8, wherein said leg proximal portion 7 is intended to remain housed in a respective slot 16 of the annular fixture 12, and wherein said distal leg portion 9 is intended to protrude or project from said annular fixture 12, e.g. axially.

Figure 1:
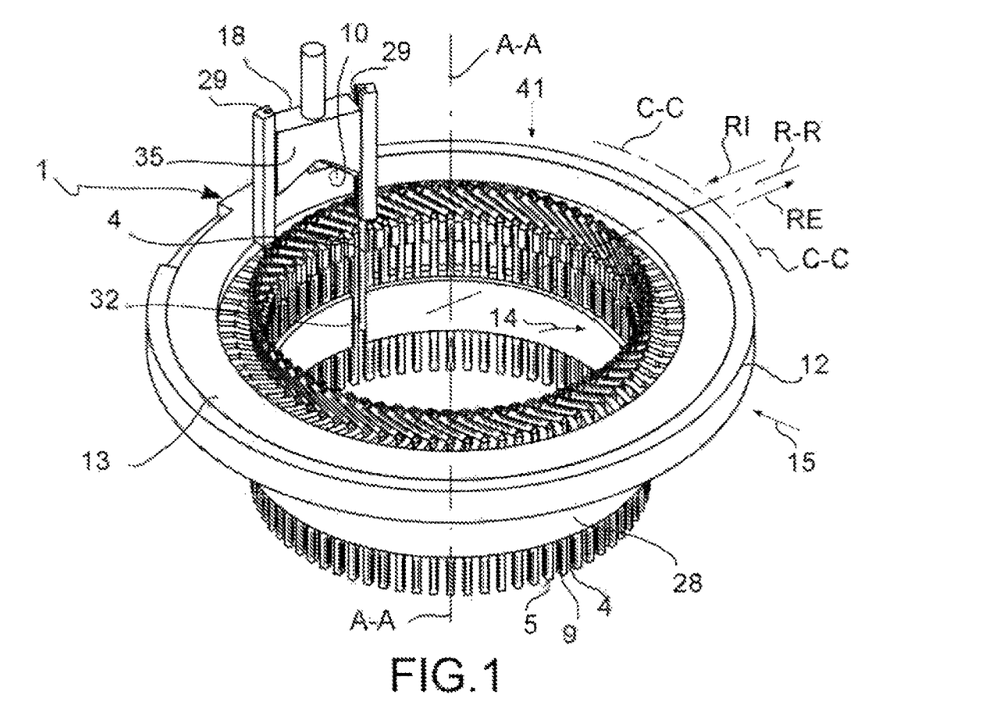
FIG. 1 is an axonometric view of an assembly comprising an annular fixture, a conductor insertion device and a guiding device according to an embodiment, wherein a plurality of bar conductors rods is inserted in respective slots of the annular fixture.
Figure 2:
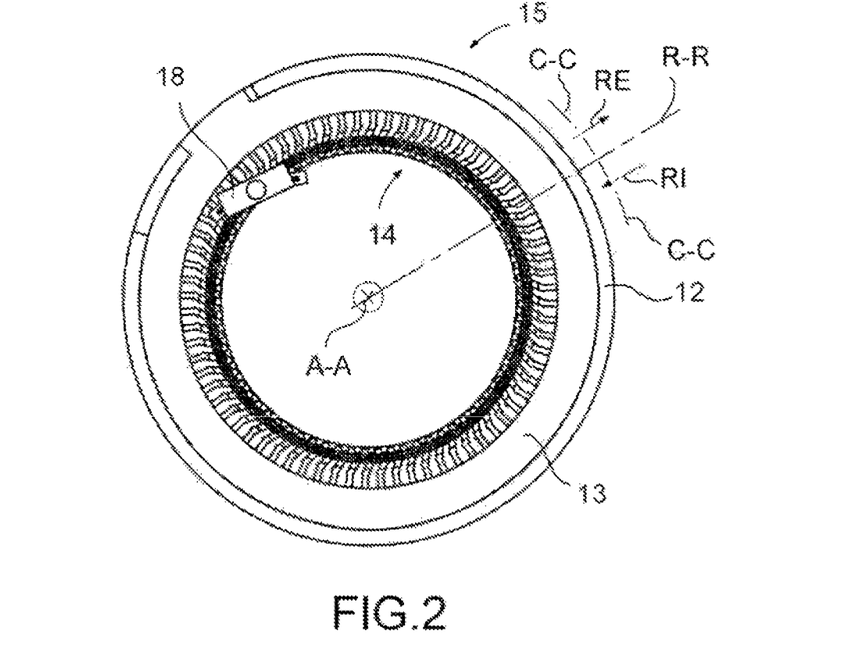
FIG. 2 shows a top plan view of the assembly in FIG. 1.
Figure 3:
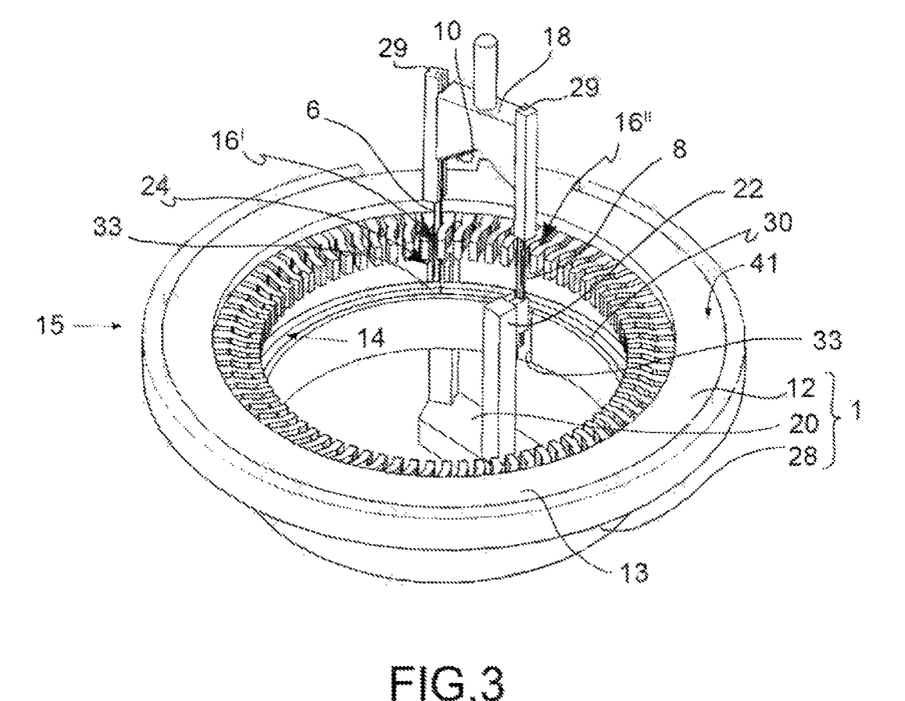
FIG. 3 is an axonometric view of an assembly comprising annular fixture, a conductor insertion device, a guiding device and a conductor moving device which grabs the legs of a bar conductor, according to an embodiment of the invention.

In the example shown in FIG. 1, the distal leg portions 9 of each leg 6, 8 of each bar conductor 4 either protrude or project from the lower side of the annular fixture 12. In other words, in the example shown in FIG. 1, the insertion side 41 is the upper side, while the insertion-opposite side 42 is the lower side.

Advantageously, said assembly 1 further comprises at least one guiding device 28 which delimits an annular containment housing 30, adapted to receive at least partially the legs 6, 8 of said plurality of legs 6, 8 of said plurality of bar conductors 4 when they are housed in said plurality of slots 16, 16', 16", forming a radial containment wall 40 for said legs 6, 8. In this manner, when the bar conductors 4 are housed in the slots, said radial containment wall 40 keeps the legs of the bar conductors confined within a predetermined radial dimension.

According to a preferred embodiment, said guiding device 28 faces towards the insertion-opposite side 42 of the annular fixture 12. In other words, the guiding device 28 is placed on the insertion-opposite side 42 with respect to the annular fixture 12. In this manner, said guiding device 28 is adapted to form at least one radial containment wall 39, 40 for the distal portions 9 of the legs 6, 8 of the bar conductors 4 when inserted into respective slots 16. According to an embodiment, said guiding device 28 forms a single radial containment wall 39 or 40 and said annular fixture 12 by at least one groove bottom wall 21 cooperates with said guiding device 28 to maintain said legs 6, 8 within a predetermined radial encumber.

By virtue of the provision of said at least one radial containment wall 39, 40 a radial abutment is formed which maintains said legs 6, 8 within a predetermined radial encumber, preferably annular in shape.

By virtue of the provision of said guiding device 28 which forms an annular containment housing 30, when at least some bar conductors 4 are inserted and housed in respective slots 16, it allows keeping the legs 6, 8, e.g. the distal portions 9 of the legs 6, 8 of the bar conductors 4, inside a predetermined radial encumber. In this manner, the transport as well as the subsequent assembly of the crown 2 or winding 2 on a stator core 34 of an electric machine is simplified.

According to a preferred embodiment, said guiding device 28 axially faces towards the insertion-opposite side 42 of the annular fixture 12.

According to an embodiment, said guiding device 28 has a substantially annular shape, wherein the inner side 14 and the outer side 15 are also defined for the guiding device 28.

According to an embodiment, said radial containment wall 39, 40 has a substantially annular shape which faces towards said containment housing 30.

In accordance with an embodiment, said guiding device 28 comprises body which defines in radial direction R-R said annular containment housing 30 forming two opposite radial containment walls 39, 40, wherein a first radial containment wall 39 faces the radial direction R-R directed toward the inner side 14 of the annular fixture, in other words it is facing toward the axis A-A, and wherein a second opposite radial containment wall is facing to the radial direction R-R towards the outer side 15 of the annular fixture 12.

According to an embodiment, said first radial containment wall 39 and said second radial containment wall 40 are made in one piece. In other words, said guiding device 28 comprises body comprising in a single piece both said first radial containment wall 39 and said second radial containment wall 40.

According to a preferred embodiment, said annular containment housing 30 is a through annular slit, preferably through in the axial direction.

According to an embodiment, said annular containment housing 30 is in the form of a groove or annular recess comprising a bottom wall, preferably axially facing, and side walls, wherein said lateral walls form said radial containment walls 39, 40.

According to a preferred embodiment, said annular containment housing 30 is directly facing said plurality of slots 16. Preferably, said annular guiding housing 30 is axially aligned with said plurality of slots 16.

According to an embodiment, said assembly 1 comprises an alignment system, adapted to axially align said annular containment housing 30 of the guiding device 28 with said plurality of slots 16 of the annular fixture 12.

Said assembly 1 further comprises a conductor moving device 20 or moving device 20, configured so as to be able to move said bar conductors 4 one at a time. Preferably, said conductor moving device 20 is configured to move said bar conductors 4 one at a time when they are inserted at least partially in the respective slots 16.

According to a preferred embodiment, said conductor moving device 20 comprises at least one influencing element 24, 22, or handling element 22, 24, adapted to apply a influencing action on at least either leg 6 or 8 of either said first leg 6 or said second leg 8 of said bar conductor 4 to insert at least a leg, preferably but not necessarily the leg subject to the influencing action, within the annular containment housing 30 of the guiding device 28, moving it rotationally about a conductor rotation axis Y-Y.

Preferably, if a leg 6 or 8 of said legs 6, 8 is already present in the annular containment housing 30 of the guiding device 28, in order to enter into annular containment housing 30 the other leg 8 or 6 is moved by the influencing action either directly or indirectly, e.g. by rotating the other leg about itself and by means of the rigidity of the bar conductor 4.

According to a preferred embodiment, said at least one influencing element 22, 24 is adapted to apply a influencing action on at least one leg 6 or 8 of either said first leg 6 or said second leg 8 of said bar conductor 4 to insert at least one leg 6 or 8 inside the annular containment housing 30 of the guiding device 28, moving it rotationally with respect to other leg 8 or 6 of the bar conductor 4.

Not necessarily, said influencing action comprises an elastic influencing action, although, according to an embodiment, it may comprise it.

According to a preferred embodiment, said influencing action is a thrusting action. For example, said influencing action is generated by a cam device. For example, said influencing action is generated by a rotating cam, e.g. by a rotating cam substantially in axis with the annular fixture 12.

According to an embodiment, said influencing action is an elastic influencing action. For example, said influencing action is generated by a spring device.

According to an embodiment, said influencing action is a gripping action.

According to an embodiment, said influencing action comprises at least one gripping action and/or at least a thrusting action and/or at least one elastic influencing action.

According to a preferred embodiment, said conductor moving device 20 comprises at least one influencing element 22, 24, e.g. a gripper, adapted to apply a influencing action on at least one leg 6 or 8 of either said first leg 6 or said second leg 8 of said bar conductor 4 to bring said at least one leg into the annular containment housing 30 of the guiding device 28, moving it with respect to the other leg 8 or 6 by a movement at least rotational about a rotation axis Y-Y.

Figure 5:
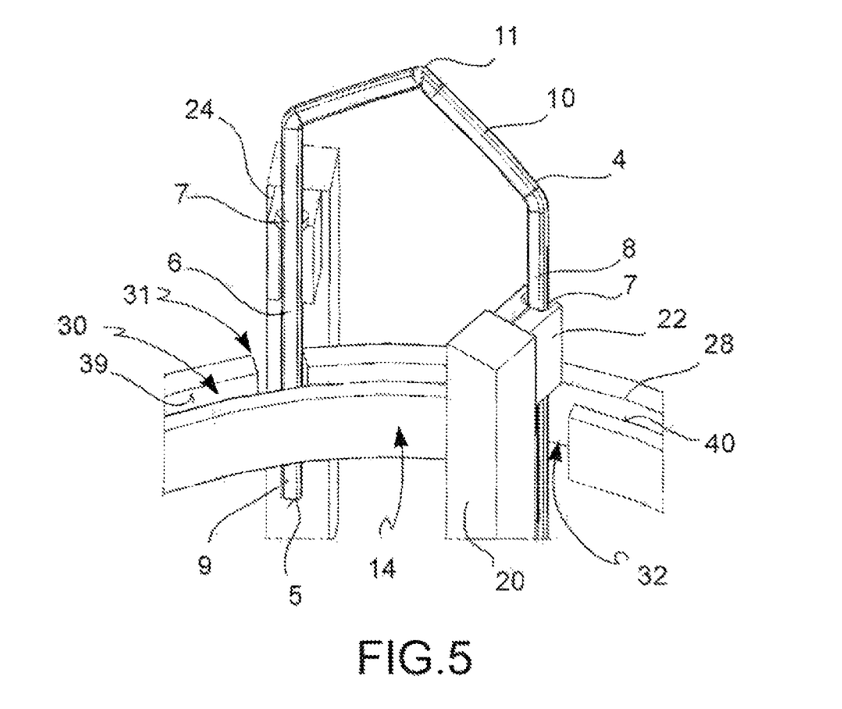
FIG. 5 is an axonometric view with parts partially transparent for the sake of clarity, which shows a detail of the moving device and of the guiding device in the configuration shown in FIG. 4.
Figure 6:
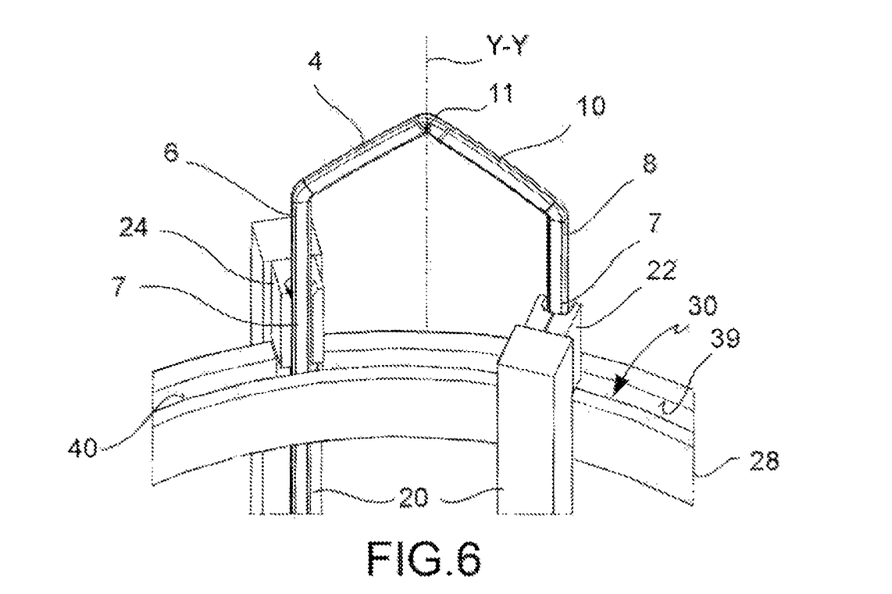
FIG. 6 is an axonometric view of the detail of FIG. 5, in which the moving device is inserting the legs of the conductor in the guiding device according to a possible mode of operation.
Figure 7:
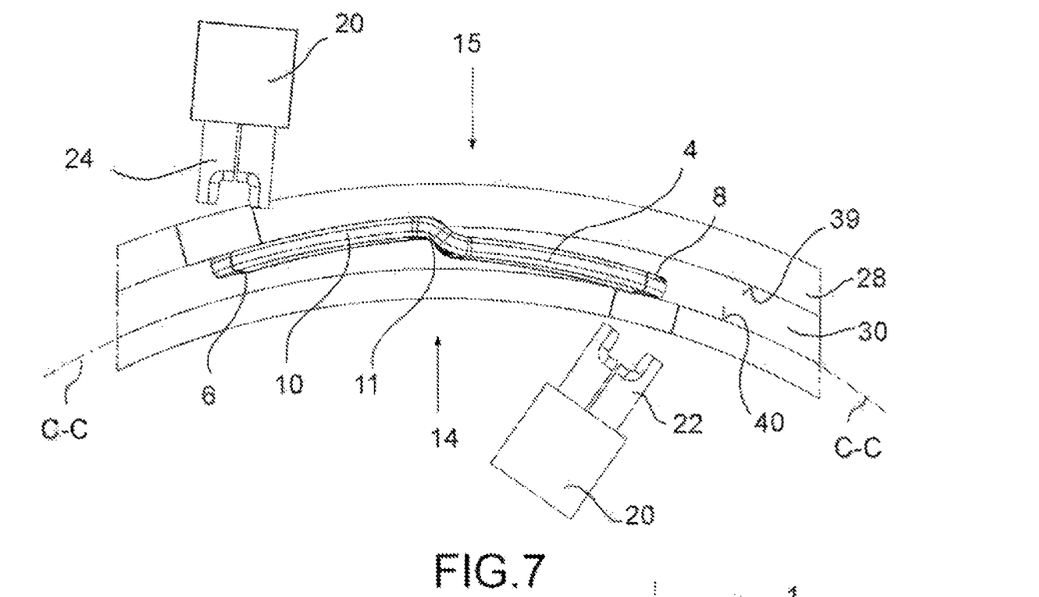
FIG. 7 shows in top plan view of the detail in FIG. 5, in which the legs of the conductor are both inserted in the guiding device, according to a possible mode of operation.
Figure 8:
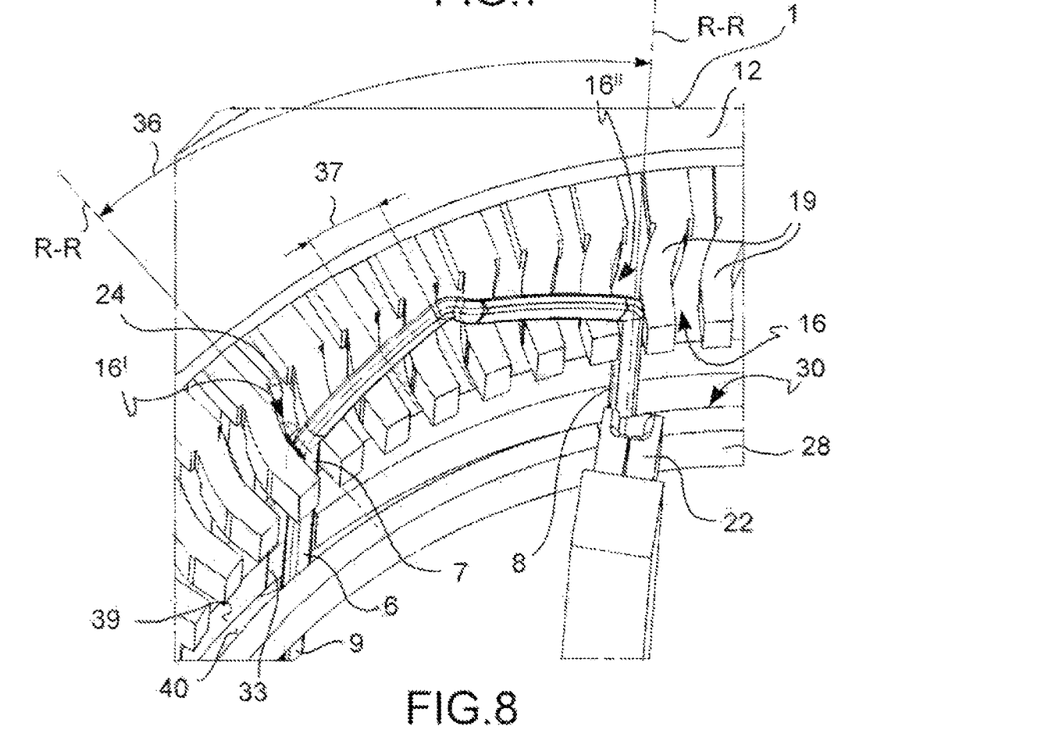
FIG. 8 is an axonometric view of a portion of an assembly, according to an embodiment.
Figure 9:
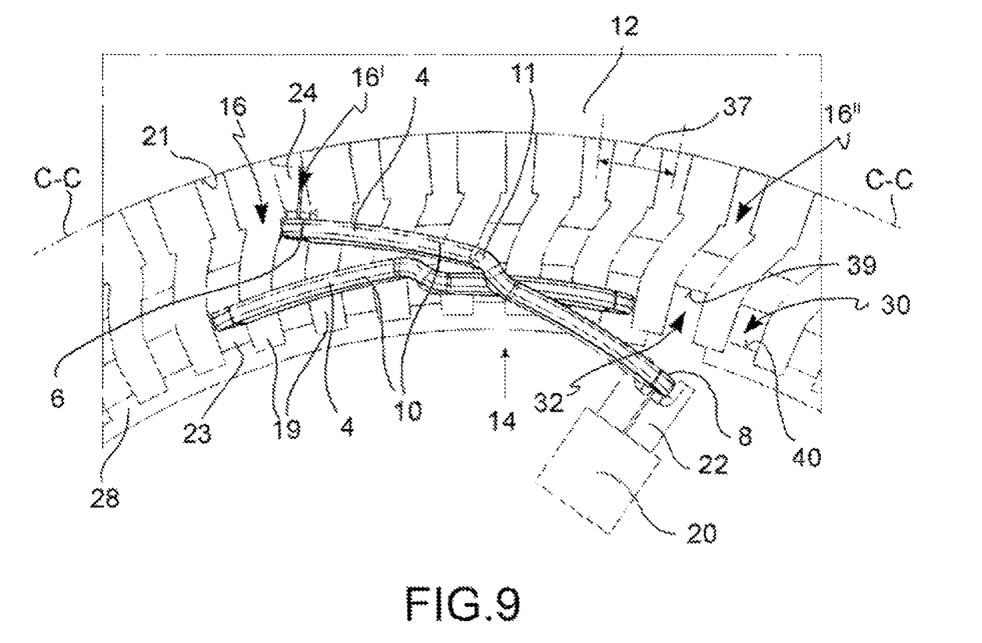
FIGS. 9 and 10 show plan and top views of two successive steps of assemblage of a winding group, according to a possible mode of operation.

As shown for example in FIGS. 4, 5, and 6, the legs 6, 8 of a bar conductor 4 are initially inserted into the respective slots 16', 16" of the annular fixture 12 by using said conductor insertion device 18, e.g. a stacker, so that the proximal portions 7 of each leg 6, 8 are received in respective slots 16 and distal portions 9 of each leg 6, 8 protrude or project from the opposite insertion side 42 of the annular fixture 12 lying substantially astride the guiding device 28, and preferably the body of the guiding device 28, binging the legs 6, 8 of a bar conductor 4 radially facing towards the opposite sides of the guide device 28, e.g. by placing said first leg 6 on the outer side 15 of the body of the guiding device 28 and said second leg 8 on the inner side 14 of the guiding device 28.

By virtue of the provision of said conductor moving device 20, it is possible to take the legs 6, 8 of the bar conductors 4, and preferably the distal portions 9 of the legs 6, 8 of the bar conductors 4, into the annular containment housing 30 of the guiding device 28 by means of an at least rotational movement, and preferably of a rototranslation, of the bar conductor 4 with respect to a definable rotation axis Y-Y, or conductor rotation axis Y-Y.

According to a preferred embodiment, said rotation axis Y-Y is substantially parallel to at least one leg 6, 8 of the bar conductor 4, and preferably to both legs 6 and 8 of the bar conductor 4.

According to a preferred embodiment, said conductor rotation axis Y-Y is substantially parallel to said fixture rotation axis A-A.

According to an embodiment, said rotation axis Y-Y passes through at least one portion of the bar conductor 4 which is moved. In other words, the at least rotational movement of the bar conductor 4 takes place about a rotation axis Y-Y passing through at least one portion of the bar conductor 4 itself.

According to an embodiment, said rotation axis Y-Y passes through said bridge portion 10 of the bar conductor 4. According to an embodiment, said bridge portion 10 of the bar conductor 4 comprises a cusp portion 11, preferably located substantially equidistant from each leg 6, 8 of the bar conductor 4, and wherein said rotation axis Y-Y passes through said cusp portion 11 of the bridge portion 10 of the bar conductor 4.

According to an embodiment, said rotation axis Y-Y substantially coincides with a leg 6 or 8 of the bar conductor 4. In this manner, a leg 6 or 8 of the bar conductor 4 is moved with respect to the other leg 8 or 6 of the bar conductor by an at least rotational movement.

According to a preferred embodiment, said guiding device 28 comprises a plurality of gates 31, 32, adapted to face said handling device 20, and preferably each of said gates of said plurality of gates 31, 32 is adapted to face a influencing element 22, 24 of the moving device 20. Preferably, each gate of said plurality of gates 31, 32 can be selectively opened, and preferably comprises a hatch 33 adapted to open said gate 31, 32 when approached radially by a influencing element 22, 24. Preferably, said hatch 33 adapted to open said gate 31, 32 when radially approached by a influencing element 22, 24 which moves a leg 6, 8 of a bar conductor 4. According to an embodiment, said hatch 33 is made in form of a swinging door. According to an embodiment, said hatch 33 is made in form of a sliding door.

According to an embodiment, said guiding device 28 comprises at least two opposed coaxial annular containment walls 39, 40 which delimit said annular containment housing 30, and wherein each of said at least two opposite coaxial annular containment walls 39, 40 comprises at least one gate of said gates 31, 32, and wherein said at least two opposite coaxial annular containment walls 39, 40 are adapted to rotate relative to each other so as to take said gates 31, 32 to a predetermined relative circumferential distance. In this manner, it is possible to adjust the distance in circumferential direction C-C between said gates 31, 32, so as to be able to receive bar conductors 4 having different hairpin throws 36 in the annular containment housing 30, avoiding deforming.

According to an embodiment, said at least two opposite coaxial annular containment walls 39, 40 are adapted to counter-rotate with respect to each other. In other words, they are adapted to rotate in opposite directions.

According to an embodiment, said at least two opposite coaxial annular containment walls 39, 40 are adapted to rotate both in the same direction at mutually different angular speeds.

By virtue of the provision of said plurality of gates 31, 32, said annular containment housing 30 can receive at least some of the legs 6, 8 of the plurality of bar conductors 4 when they are moved by said at least rotational movement about said conductor rotation axis Y-Y by the handling device 20 towards the guide device 28.

By virtue of the provision of said moving device 20, the legs of each conductor can be inserted in said annular containment housing 30 of the guiding device 28 without twisting or bending them and avoiding the axial movement of said bar conductor 4, for example avoiding the axial movement of said bar conductor 4 so as to extract it at least partially from the slots 16.

According to an embodiment, each of said gates 31, 32 is adapted to put into communication the annular containment housing 30 along the radial direction R-R with either the inner side 14 of the guiding device 28 or the outer side of the guiding device 15. For example, a first gate 31 when open puts into communication along the radial direction R-R the annular containment housing 30 with the outer side 15, and a second gate 32 when open puts in communication along the radial direction R-R the annular containment housing 30 with the inner side 14.

According to an embodiment, said conductor moving device 20 is adapted to straddle the guiding device 28, facing said first influencing element 22 on said inner side 14 of the guiding device 28 and said second influencing element 24 facing said outer side 15 of the guiding device 28.

According to an embodiment, said conductor moving device 20 comprises a first influencing element 22 and a second influencing element 24, wherein said first influencing element 22 is adapted to grip said bar conductor 4, and preferably at least one leg 6, 8 of the bar conductor 4, and more preferably a single leg 6, 8 at a time, preferably from said inner side 14 of the guiding device 28, and wherein said second influencing element 24 is adapted to grip said bar conductor 4, and preferably at least one leg 6, 8 of the bar conductor 4, and more preferably a single leg 6, 8 at a time, preferably from said outer side 15 of the guiding device 28. Preferably, said influencing elements 22, 24 are handling elements 22, 24. Preferably, said influencing elements 22, 24 comprise gripping elements 22, 24, such as for example grippers, and/or thrust elements 22, 24, such as for example pistons, and/or cams.

According to an embodiment, said conductor moving device 20 is adapted to grasp more than one bar conductor 4 at a time. In this manner, more than one crown of conductors 2 can be provided each time. For example, in this manner, it is possible to provide winding groups or crowns of conductors 2 of the ABAB type, where the letters indicate the alternating succession in the radial direction of the crowns of conductors. For example, in this manner, it is possible to make winding groups or crowns of conductors 2 of the ABBA, ABAB type and the like.

Figure 10:
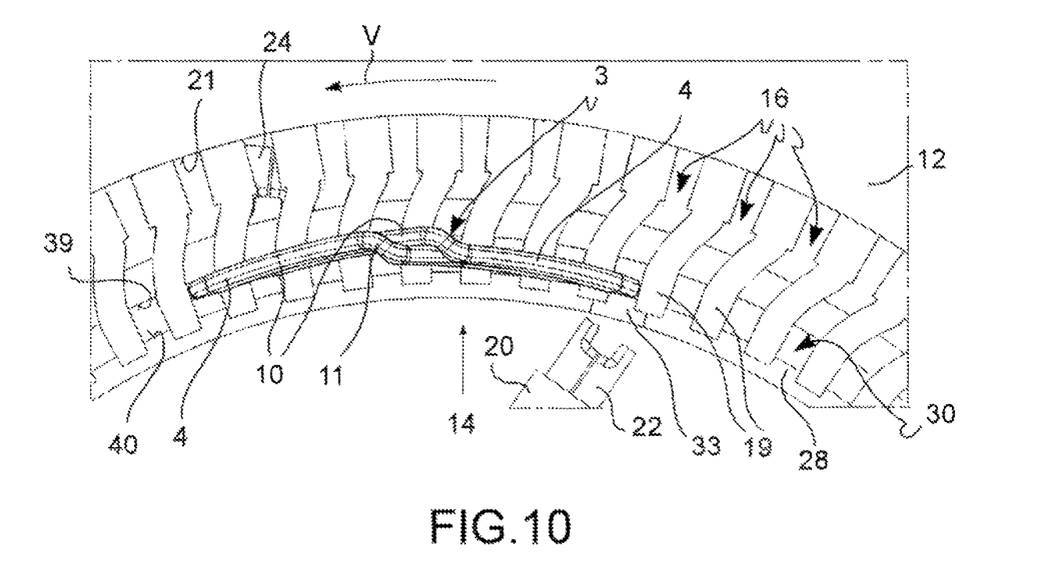

When in operative condition, as shown for example in FIG. 10, after the legs 6, 8 of a single bar conductor 4 are inserted in the annular containment housing 30, the annular fixture 12 performs a rotation about said axis A-A with respect to the moving device 20 and/or with respect to the guiding device 28 and/or to the insertion device 18, so as to make another slot 16 face the gripper 22 of the handling device 20. In other words, said annular fixture 12 is adapted to rotate by a predetermined angular amount in a predetermined direction of rotation V so that, by effect of the rotation of the annular fixture 12 about said axis A-A, a new slot 16 will be taken into the circumferential position which was occupied by the slot 16 which houses a leg 6, 8 of said single bar conductor 4.

Preferably, the rotation of the annular fixture 12 about said axis A-A spaces an angular amount corresponding to the distance between the two adjacent slots 16. In this manner, by effect of the rotation of the annular fixture 12 around said axis A-A, a new slot 16 is taken into the circumferential position which was occupied by the adjacent slot 16.

The provision of said teeth 19 allows rotating the crown segment 3 by said predefined angular amount, and particularly all conductors 4 which form the crown segment 3 in block i.e. integrally with one another.

According to an embodiment, the rotation of the annular fixture 12 about said axis A-A spaces an angular amount corresponding to the distance between a given number of adjacent slots, in other words the rotation of the annular fixture 12 about said axis A-A sweeps an angular amount corresponding to a multiple 36 of the pitch of single groove 37.

Preferably, said angular amount corresponding to the distance between the two adjacent slots 16 when evaluated in circumferential direction C-C corresponds to an individual slot pitch 37. Preferably, said multiple of slot pitch 37 (hairpin throw 36) is the projection in circumferential direction C-C of an angular amount corresponding to the distance between the two slots 16', 16" respectively intended to receive the legs 6, 8 of a bar conductor 4 itself. Preferably, said hairpin throw 36 is substantially equal to a given number of steps of the single slot 37, e.g. comprised between four and seven steps of single slot 37.

By virtue of the rotation of the annular fixture 12 about said axis A-A, it is possible to insert the legs 6, 8 a further bar conductor 4 into the respective slots 16 of the annular fixture 12, without imposing the movement of the moving device 20 as well as of the conductor insertion device 18.

According to an embodiment, said annular fixture 12 is operationally connected to a motor, e.g. a stepper motor, adapted to determine the rotation of the annular fixture 12 around said axis A-A. The provision of said motor is particularly advantageous when used in combination with the parallelism between axis A-A and rotation axis Y-Y.

According to an embodiment, said annular fixture 12 comprises at least one fixed portion and at least one movable portion, wherein said movable portion of the annular fixture 12 is operatively connected to said motor adapted to determine the rotation of the movable portion with respect to the fixed portion of the annular fixture 12 about said axis A-A. Preferably, said movable portion of the annular fixture 12 comprises said plurality of teeth 19.

According to an embodiment, said assembly 1 further comprises at least one control and actuation unit adapted to transmit control signals to at least some among: said conductor movement device 20, said motor, said conductor insertion device 18, said at least one gate 31, 32 of the guiding device 28.

According to an embodiment, said assembly 1 comprises a plurality of sensors, adapted to detect information on the status of said assembly 1 and/or of said bar conductor 4, said plurality of sensors cooperate with said at least one control and actuation unit to transmit to said control and actuation unit said detected information on the status of said assembly 1 and/or of said bar conductor 4. According to an embodiment, said plurality of sensors cooperate with said at least one control and actuation unit to implement a control feedback, e.g. on the basis of the information detected by said plurality of sensors.

The provision of said control and actuation device allows automating the formation of said crown 2 of bar conductors.

A method of assemblage of a winding group of a bar winding for an electric machine 2 will be described below.

According to a general embodiment, a method of assemblage of at least one winding group 2 of a bar winding for an electric machine comprises the following steps:

providing an annular fixture 12 which extends surrounding an axis A-A defining an axial direction which is either coincident with or parallel to said fixture rotation axis A-A, said annular fixture 12 delimiting a plurality of slots 16;

providing at least one bar conductor 4 comprising a first leg 6, a second leg 8 and a bridge portion 10 to connect said first leg 6 and said second leg 8 to each other, said bar conductor 4 being shaped so that the respective legs 6, 8 are mutually spaced apart by a predetermined distance;

inserting the legs 6, 8 of the bar conductor 4 into respective slots 16 of the annular fixture 12 so that the distal portion 9 with at least one leg 6, 8 protrudes from the annular fixture 12;

applying a influencing action on at least one leg 6 or 8 of said bar conductor 4;

rotationally moving said at least one leg of the bar conductor 4 about a conductor rotation axis Y-Y;

inserting said at least one leg 6 or 8 into an annular containment housing 30 which forms at least one radial containment wall 39, 40 for at least said leg 6 or 8.

According to a possible mode of operation, said step of moving is performed by moving a leg 6 or 8 by a rotational movement relative to the other leg 8 or 6 of the bar conductor 4.

According to a possible mode of operation, said step of moving is performed by moving a leg 6 or 8 by a rotational movement relative to conductor rotation axis Y-Y, preferably parallel to the legs of said bar conductor 4.

According to a possible mode of operation, said step of applying a influencing action envisages the step of applying a gripping action.

By virtue of the step of applying a gripping action, firmly grasping the leg of the bar conductor 4 is allowed, whereby avoiding undesired torsions of the leg itself.

According to a possible mode of operation, the step of inserting comprises the step of providing a guiding device 28 comprising at least one radial containment wall 39, 40 which delimits said annular containment housing 30.

According to a possible mode of operation, the method comprises the further step of rotating said annular fixture 12 by a predetermined angular amount in a predetermined direction of rotation V.

By virtue of the step of rotating said annular fixture 12 it is possible to insert a further bar conductor 4 into the annular fixture whereby avoiding the movement of said insertion device 18 in the circumferential direction C-C.

According to a possible mode of operation, the method is adapted to manage even more than one bar conductor 4 at a time, e.g. while gripping the respective first legs 6 of two distinct bar conductors 4 simultaneously, moving them with respect to the respective second legs 8.

According to a possible mode of operation, the method comprises the further step of guiding the legs 6, 8 of the bar conductors 4, and preferably the distal portion 9 of the legs 6, 8 of the bar conductors 4, during the step of rotating of said annular fixture 12 by a predetermined angular amount in a predetermined direction of rotation V. Preferably, the step of guiding allows maintaining the distal portion 9 of the legs 6, 8 of the bar conductors 4 within a predetermined radial encumber during the rotation of the annular fixture by a predefined direction of rotation V.

The provision of said guiding device 28 allows containing the legs 6, 8 of the bar conductor 4 at least temporarily last inserted within a predetermined radial encumber. In this manner, it is possible to associate two adjacent bar conductors 4 in mutual position substantially same to that which they will assume when mounted on the stator core 34 from the time of insertion of their legs 6, 8 into the annular containment housing 30 of the guiding device 28. In other words, by virtue of such a guiding device 28, it is possible to favorably arrange in the desired substantially braided or wrapped arrangement the plurality of bar conductors 4, in order to assemble a winding group 2 ready to be fitted on a stator core 36 of an electric machine.

The provision of said guiding device 28 allows guiding the movement of the distal portions 9 of the legs 6, 8 which protrude or project from the annular fixture 12 during the rotation of the annular fixture 12, whereby confining them in predetermined radial encumber defined by said at least one radial containment wall 39, 40.

According to a preferred mode of operation, said step of applying a influencing action on at least one leg 6 or 8 of said bar conductor 4 is performed by applying a gripping action on said at least one leg 6 or 8 of said conductor bar 4.

According to a possible mode of operation, the method comprises the further step of iteratively repeating the step of providing a bar conductor 4.

By virtue of the provision of the step of repeating, it allows making at least one portion of a winding group 2 or crown of conductors 2 of annular shape. Preferably, a portion of a winding group 2 or crown of conductors 2 is said segment of crown of conductors 3 or winding group segment 3.

According to a possible mode of operation, the method comprises, after the step of repeating, the further step of interposing a first leg 6 of a bar conductor 4 between the bottom wall of the slot 21 of a given slot 16' of the annular fixture 12 and a second leg 8 already inserted in the same slot 16' of a further bar conductor 4.

According to a possible mode of operation, the method comprises, after the step of repeating, the further step of interposing a second leg 6 of a bar conductor 4 between the opening of a slot 16', or slot mouth 23, of a given slot 16' of the annular fixture 12 and a first leg 6 already inserted in the same slot 16' of a further bar conductor 4.

By virtue of said method, it is also possible to insert the legs 6, 8 of a plurality of bar conductors 4 one at a time in the respective slots 16.

Preferably, the step of repeating the previous steps is performed until the winding group 2 is completely formed.

Figure 11:
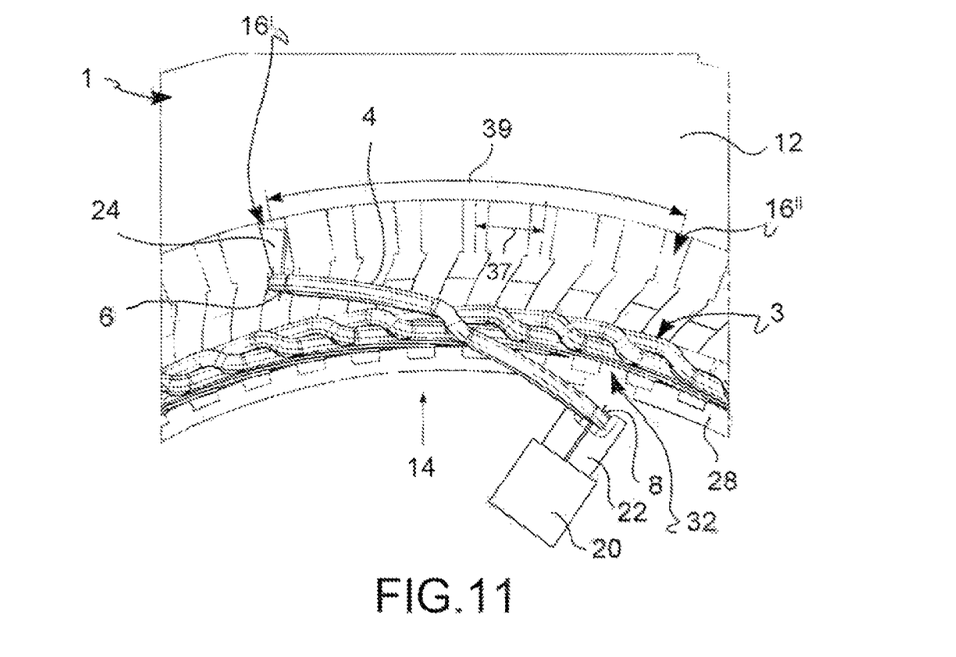
FIGS. 11 and 12 both show plan and top views of two successive steps of assemblage of a winding group, according to a possible mode of operation.
Figure 12:
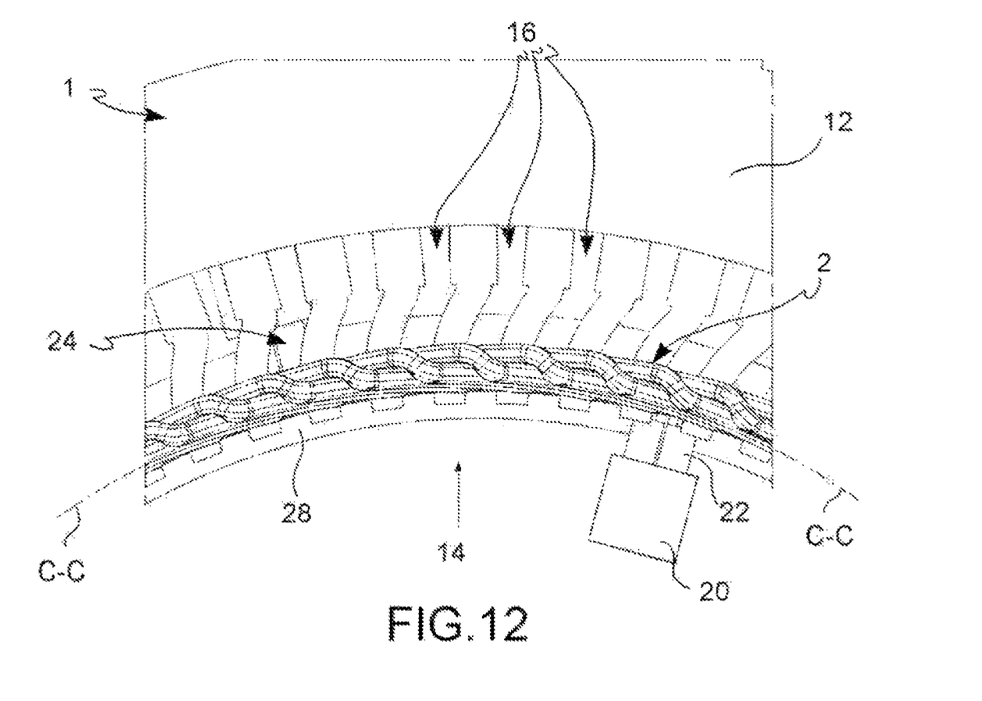
Figure 13:
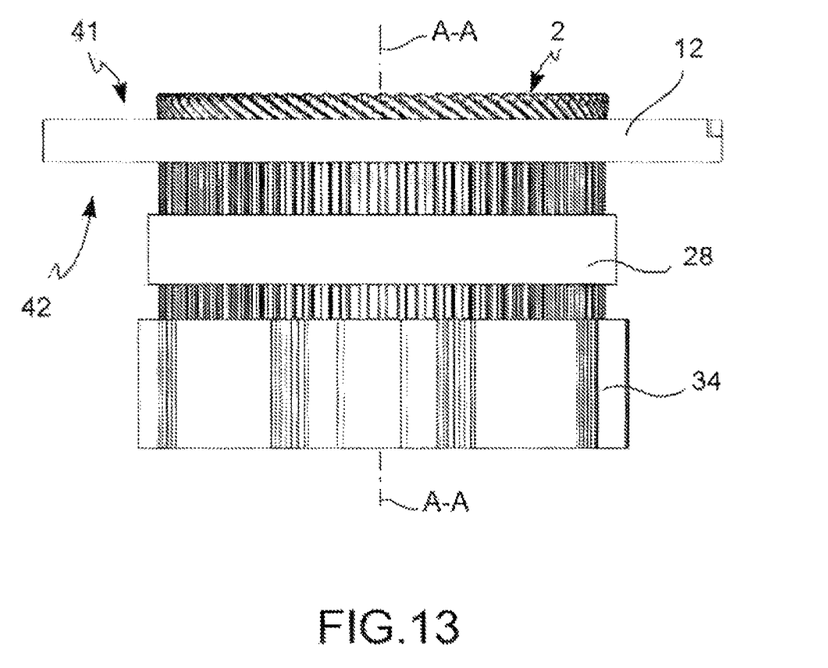
FIG. 13 shows a vertical elevated view of an assembly, according to an embodiment, about to associate the conductors crown with a stator core, according to a possible mode of operation.
Figure 14:
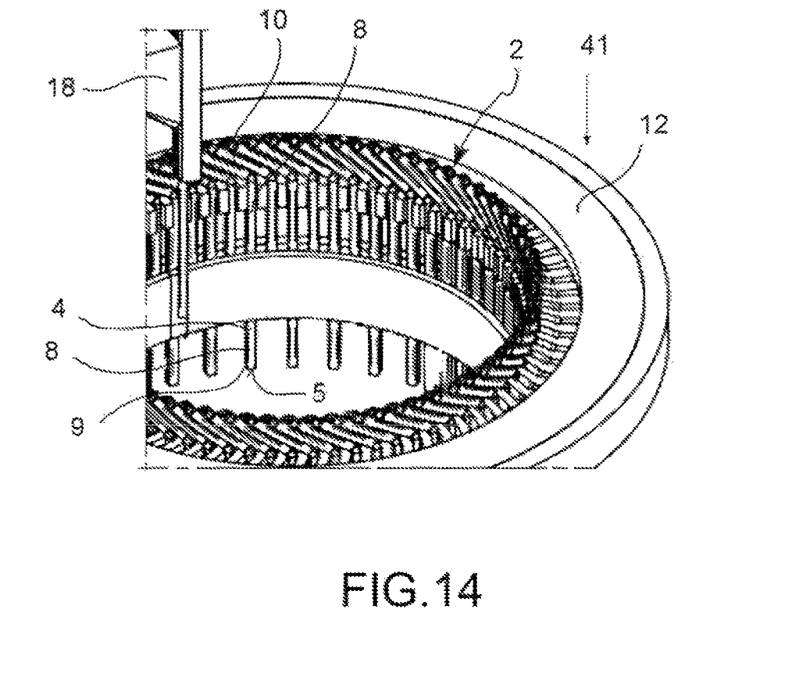
FIG. 14 is an axonometric view of a detail of an assembly, according to an embodiment, in which a plurality of bar conductors is arranged having legs of different length, according to a mode of operation.

When in operating conditions, as shown for example in FIG. 11, at each repetition, the method allows accommodating iteratively the legs 6, 8 of a plurality of bar conductors 4 in the respective slots 16 of the annular fixture 12, forming an array of bar conductors 4, which forms at least one crown segment 3 or winding group segment 3 having substantially the shape of an arch or a portion of a ring.

According to a possible mode of operation, the step of at least rotationally moving envisages performing a roto-translation of the bar conductor 4 with respect to said guiding device 28.

According to a possible mode of operation, the step of at least rotationally moving is performed by applying a influencing action on both legs 6, 8 simultaneously, preferably by using both said influencing elements 22, 24. For example, the influencing action is a gripping action applied on both legs at the same time, preferably by using both said influencing elements 22, 24 which act as gripping elements, such as grippers or the like.

According to a possible mode of operation, said method comprises the following further steps of:

assembling a crown of conductors 2 on said annular fixture 12;

transporting said crown of conductors 2 towards a stator core 34 of an electric machine;

fitting said crown of conductors 2 on said stator core 34.

According to a possible mode of operation, the step of fitting comprises the step of axially approaching said stator core 34.

According to a possible mode of operation, the step of fitting comprises the step of retracting the teeth 19 into the dimensions of the body of the annular fixture 12. Preferably, the step of retracting is performed by means of a cam device, and preferably all of the teeth 19 are retracted simultaneously. Preferably, the step of retracting is performed during the step of fitting, when the crown of conductors 2 is partially mounted or fitted on the stator core 34.

The provision of said guiding device 28 allows simplifying said steps of transporting and fitting.

According to a possible mode of operation, the method comprises, after the step of fitting, the step of axially pulling out said annular fixture 12 and said guiding device 28 from said stator core 34, avoiding to remove the crown of conductors 2 from the stator core 34 in which it is partially inserted.

According to an embodiment, said assembly 1 is adapted to assemble basic conductors leaving empty gaps in the winding group 2 for the successive assembly of special conductors (e.g. "W-pins"), by means of a further auxiliary device, before the annular fixture 12 is pulled out from the winding assembly 2, when it is partially inserted in a stator core.

According to a possible mode of operation, said method comprises the following further steps of:
  detecting information on the status of said annular fixture 12 and/or of said crown of conductors 2 and/or of said segment of the crown of the conductors 3;
  controlling the actuation of said movement device 20 and/or said insertion device 18 on the basis of the detected information.

According to a possible mode of operation, the step of inserting the legs 6, 8 of the bar conductor 4 into the respective slots 16 of the annular fixture 12, is accomplished by using a conductor insertion device 18, e.g. a stacker, comprising an input slider 35 and the like. According to an embodiment, said insertion slider 35 is associated by sliding with said insertion guiding device 29.

According to a possible mode of operation, the step of inserting the legs 6, 8 of the bar conductor 4 into the respective slots 16 of the annular fixture 12 is performed by approaching the slots 16 in axial direction.

According to a possible mode of operation, the step of inserting at least one of the legs 6, 8 of the bar conductor 4 into respective slots 16 of the annular fixture 12, comprises the following sub-steps:
  fitting a bar conductor on said conductor insertion device 18, preferably by taking said bridge portion 10 to abut against said input slider 35, and preferably to abut against a portion of said input slider 35 facing at least one slot 16;
  applying a influencing action on the bridge portion 10 of the bar conductor 4;
  guiding said thrust action to insert the legs 6, 8 of the bar conductor 4 into respective slots 16', 16" of the annular fixture 12.

According to a possible mode of operation, the step of applying a pushing action on the bridge portion 10 is performed by approaching said input cursor 35 to said annular fixture 12, and preferably by approaching said input cursor 35 along the axial direction to at least one slot 16 of said annular fixture 12.

According to a possible mode of operation, the step of inserting said at least one leg 6 or 8 in an annular containment housing 30 comprises the step of opening said door 33 so as to make accessible said at least one gate 31, 32. According to a possible mode of operation, the method comprises the step of closing the hatch after the step of inserting said at least one leg 6 or 8 in an annular containment housing 33.

According to a possible mode of operation, the step of inserting said at least one leg 6 or 8 in an annular containment housing 30 comprises the step of approaching said guiding device 28 radially.

According to a possible mode of operation, the step of inserting said at least one leg 6 or 8 in an annular containment housing 30 is performed by applying a influencing action on each of said legs 6, 8 of a bar conductor 4, and preferably by means of said gripping elements 22, 24 of the conductor moving device 20.

According to a possible mode of operation, the step of inserting said at least one leg 6 or 8 in an annular containment housing 30 comprises the step of approaching said guiding device 28 radially on the inside 14 and the outside 15.

According to a possible mode of operation, said predefined angular amount is equal to the pitch of the individual slot pitch 37.

By virtue of the features described above, either mutually separately or jointly in particular embodiments, it is possible to obtain an assembly 1 and a method which at the same time meets the aforesaid mutually contrasting needs and the aforesaid desired advantages, and in particular:
  it allows guiding the legs of the bar conductors during the formation of the crown of conductors 2;
  it allows automating the formation of a crown of conductors 2;
  it allows automating the installation of a crown of bar conductors on an electric machine, e.g. on a stator core, avoiding the use of known machines, such as gripper assemblies, used for extracting the crown of conductors from a fixture useful for the formation of the crown itself;
  it is possible to assemble a crown of conductors 2 formed by bar conductors 4 having a leg 6 or 8 having a length greater than the other 8 or 6 as well as the conductors having flat or rectangular cross-section.

Those skilled in the art may make many changes and adaptations to the embodiments described above or may replace elements with others which are functionally equivalent in order to meet contingent needs without however departing from the scope of the appended claims.

LIST OF REFERENCES

1 Assembly or apparatus
2 Crown of conductors or winding group
3 Crown segment or winding group segment
4 Bar conductor or hairpin
5 Free end of conductor leg
6 First leg of conductor
7 Proximal portion of leg of conductor
8 Second leg of conductor
9 Distal portion of leg of conductor
10 Bar conductor bridge portion
11 Bar conductor cusp
12 Annular fixture
13 Annular fixture body
14 Radially inner side
15 Radially outer side
16,16',16" Slot
18 Conductor insertion device
19 Annular fixture teeth
20 Conductor moving device
21 Slot bottom wall
22 First influencing element or first handling element
23 Slot mouth 24 Second influencing element or second handling element
25 Gripper leg housing
28 Guiding device
29 Insertion guiding device of the insertion device
30 Annular containment housing
31.32 Guiding device gates
33 Guiding device hatch
34 Stator core
35 Insertion device slider
36 Hairpin throw or hairpin span or hairpin pitch
37 Slot pitch
39,40 Guiding device radial containment walls
41 Insertion side
42 Opposite side insertion
43',43" First and second wall of teeth
A-A Fixture rotation axis
R-R Radial direction
RE Outer radial direction
RI Inner radial direction
C-C Circumferential direction
Y-Y Conductor rotation axis
V Fixture rotation direction

The invention claimed is:

1. A method for assembling at least one winding group of a bar winding for an electric machine, the method comprising the following steps:

providing an annular fixture which extends surrounding a fixture rotation axis (A-A) defining an axial direction either coincident with or parallel to said fixture rotation axis (A-A), said annular fixture delimiting a plurality of slots;

providing a bar conductor comprising a first leg, a second leg and a bridge portion to connect said first leg and said second leg to each other, said bar conductor being shaped so that the first and second legs are mutually spaced apart by a predetermined distance;

inserting the legs of the bar conductor into respective slots of the plurality of slots of the annular fixture so that a distal portion of at least one leg protrudes from the annular fixture;

applying influencing action on at least one leg of said bar conductor;

rotationally moving said at least one leg about a conductor rotation axis (Y-Y);

inserting said at least one leg into an annular containment housing forming at least one radial containment wall for said at least one leg.

2. The method of claim 1, further comprising at least one of the following steps:

rotating said annular fixture by a predetermined angular amount in a predetermined rotation direction (V); and/or iteratively repeating the previous steps from the step of providing a bar conductor; and/or wherein iteratively repeating the previous steps until the at least one winding group is completely formed; and/or wherein iteratively repeating the previous steps up to assembling a plurality of concentric arrays of bar conductors; and/or wherein the step of applying influencing action on at least one leg of said bar conductor is performed by applying a gripping action on said at least one leg of said bar conductor bar; and/or wherein the rotationally moving step is performed by moving at least one leg of either said first leg or second leg by a rotational movement relative to the other leg of the bar conductor.

3. The method of claim 1, wherein the step of inserting at least one leg of the legs of the bar conductor into respective slots of the annular fixture, further comprises the following steps:

fitting the bar conductor on a conductor insertion device; applying influencing action on the bridge portion of the bar conductor;

guiding said thrust influencing action to insert the legs of the bar conductor into respective slots of the annular fixture; and/or wherein the method further comprises the steps of:

assembling a crown of conductors on said annular fixture; transporting said crown of conductors towards a stator core of an electric machine;

fitting said crown of conductors on said stator core.

4. The method of claim 1, wherein:

the rotationally moving step includes performing a rototranslation of the bar conductor with respect to said at least one guiding device; and/or wherein the rotationally moving step is performed by applying influencing action on both legs simultaneously, preferably by using both said influencing elements; and/or wherein an assembly is adapted to assemble basic hairpin conductors leaving empty gaps for successive assemblage of special hairpin conductors, by means of a further auxiliary device, before the annular fixture is pulled out from the winding group, when it is partially inserted in a stator core.

* * * * *